United States Patent Office 3,101,354
Patented Aug. 20, 1963

3,101,354
PROCESS FOR THE PREPARATION OF 19-NOR-TESTOSTERONE AND COMPOUNDS USED IN THIS PROCESS
Gerard Nominé, Noisy-le-Sec, Daniel Bertin, Montrouge, Jean Tessier, Paris, André Pierdet, Noisy-le-Sec, and Robert Bucourt, Villiers le Bel, France, assignors, by mesne assignments, to Roussel-UCLAF, S.A., Paris, France, a corporation of France
No Drawing. Filed Nov. 13, 1961, Ser. No. 152,045
Claims priority, application France Nov. 16, 1960
13 Claims. (Cl. 260—397.4)

The present invention relates to a process for the preparation of 19-nor-testosterone by direct synthesis. The invention also relates to, as novel industrial products, the compounds used in this process.

The direct synthesis of 19-nor-testosterone and its esters has previously been reported by Chinn et al., Résumé of the 134th Meeting, American Chemical Society, September 1958, page 14–0. This process involved many synthesis steps and resulted in low yields. The process of the present invention is distinguished, from the industrial point of view, by its simplicity of reactions and the ease of their execution.

It is an object of the present invention to develop a process for the direct synthesis of 19-nor-testosterone and its esters, either in the racemic mixture or in the optically active form, having the formula:

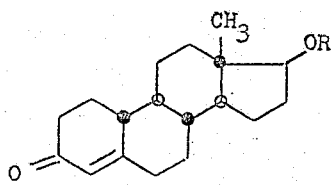

wherein R represents a radical selected from the group consisting of hydrogen and the acyl radical of an organic carboxylic acid having 1 to 18 carbon atoms.

Another object of the invention is the preparation of the intermediate 3-methyl-7-oxo-8-(3′-oxobutyl)-3,4-[3′-acyloxy-cyclopentano-(2′,1′)]-decahydronaphthalene compounds of the formula:

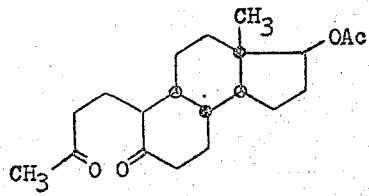

wherein Ac represents the acyl radical of an organic carboxylic acid having from 1 to 18 carbon atoms, and especially 3-methyl-7-oxo-8-(3′-oxobutyl)-3,4-[3′-benzoyloxy-cyclopentano-(2′,1′)]-decahydronaphthalene.

These and other objects of the invention will become more apparent as the description thereof proceeds.

This application is a continuation-in-part of copending United States patent application Serial No. 36,172, filed June 15, 1960, now abandoned.

In accordance with the process of the invention, the stages of which are shown in the flow sheet of Table I, 19-nor-testosterone, in either the racemic mixture or an optically active form, is obtained by starting from either racemic or optically active $\Delta^{8(9)}$-3-methyl-7-oxo-8-(3′-oxobutyl)-3,4-[3′-acyloxy-cyclopentano-(2′,1′)]-octahydronaphthalene compounds of the Formula I:

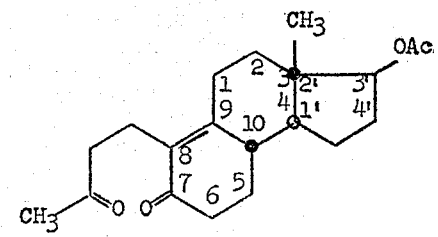

wherein Ac represents the acyl radical of an organic carboxylic acid having from 1 to 18 carbon atoms. The preparation of the starting compounds is described in copending, commonly assigned United States Patent 3,019,252. These compounds are catalytically reduced under neutral or alkaline reaction conditions into the corresponding 3-methyl-7-oxo-8-(3′-oxobutyl)-3,4-[3′-acyloxy-cyclopentano-(2′,1′)]-decahydronaphthalene compounds of Formula II, which are then cyclized with the aid of dehydrating agents to give 19-nor-testosterone or its esters of Formula III.

TABLE I

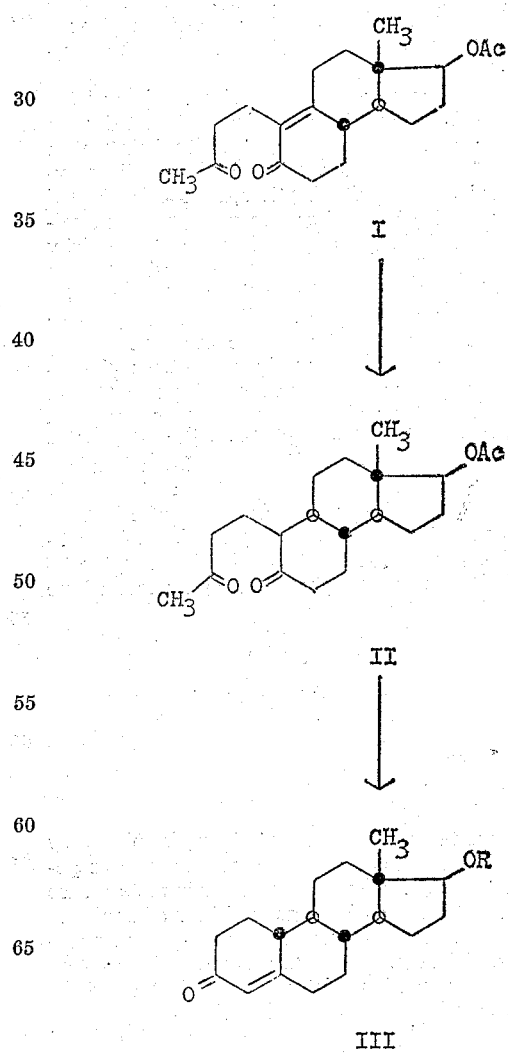

Ac=the acyl radical of an organic carboxylic acid having from 1 to 18 carbon atoms.

R=hydrogen and the acyl radical of an organic carboxylic acid having from 1 to 18 carbon atoms.

Within the scope of the above general definition, the process of the invention is advantageously executed by using as the starting compound $\Delta^{8(9)}$-3-methyl-7-oxo-8-(3'-oxobutyl)-3,4-[3'-benzoyloxy-cyclopentanto-(2'-1')]-octahydronaphthalene (Compound I wherein Ac=C$_6$H$_5$CO). However, other esters of organic carboxylic acids having from 1 to 18 carbon atoms, such as the alkanoic and alkenoic acids, for example, acetic, trimethylacetic, propionic, 4,4-dimethyl-pentanoic, 10-undecenoic acids; the cycloalkyl-alkanoic acids, for example, β-cyclopentyl-propionic acid; the arylalkanoic acids, for example, phenyl-propionic acid; the cycloalkyl carboxylic acids, for example, hexahydrobenzoic and hexahydroterephthalic acids, and other phenylcarboxylic acids may also be used without departing from the scope of the invention.

The catalytic reduction of compound I is preferably effected by a catalyst such as palladized carbon at a pH range from the neutral point to a strongly basic pH and the hydrogenation is effected at atmospheric pressures or elevated pressures. No increase in temperature is required although elevated temperatures may be used. The reduction is effected in the presence of an inert organic solvent.

In one mode of execution, the catalytic reduction step is the usual reduction step where the catalyst employed is palladized carbon which has been carefully prepared to avoid residual traces of acidity. The reaction is conducted in an inert organic solvent such as ethanol at a neutral pH and at about room temperature and atmospheric pressure.

In another, and preferable mode of execution of the catalytic reduction step, the reduction is effected at a strongly basic pH. The optimum basicity being at a pH of about 11 with a catalyst based on palladium hydroxide. Particularly, the catalytic reduction is effected in the presence of palladized carbon prepared from palladium hydroxide in a basic media in which the basicity of the reaction media is obtained by the addition thereto of triethylamine sufficient to bring the pH to about 11. The reaction takes place upon introduction of hydrogen at room temperature and atmospheric pressure.

Under neutral or alkaline reaction conditions, the reduction is stereospecific and when the pH is about 11 in the reduction step, the yields are considerably increased. When $\Delta^{8(9)}$-3-methyl-7-oxo-8-(3'-oxobutyl)-3,4-[3'-benzoyloxy-cyclopentano-(2',1')]-octahydronaphthalene is catalytically reduced at a pH of about 11, a pure, easily crystallizable product is obtained in yields of 95%.

In one mode of execution, the cyclization of the 3-methyl-7-oxo-8-(3'-oxobutyl)-3,4-[3'-acyloxy-cyclopentano-(2',1')]decahydronaphthalene compounds of the formula:

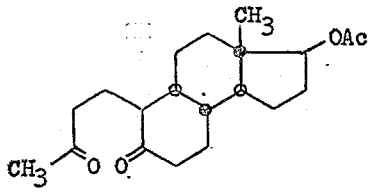

wherein Ac has the meaning defined above, is effected by the action of alkali metal lower alkanolates such as potassium methylate at elevated temperatures in the presence of an inert organic solvent such as the lower alkanol corresponding to the alkanolate used. The temperatures employed are sufficient to reflux the solvent. The reaction in this mode of execution causes a saponification of the ester and results in formation of 19-nor-testosterone.

In another mode of execution the cyclization is effected at room temperature with the aid of concentrated hydrochloric acid. The operation is preferably carried out in an acetic acid medium under anhydrous conditions.

This second mode of execution makes its possible to avoid saponification of the ester and thus the esters of 19-nor-testosterone are obtained directly, starting from the tricyclic compounds serving as the starting material. Moreover, it has the advantage of producing very high yields.

It will be understood, however, that it is possible, if necessary, to saponify the esters thus obtained by this mode of execution and to obtain thereby the free 19-nor-testosterone.

It is also understood that 19-nor-testosterone may be esterified or etherified according to known procedures.

In order to prepare the preferred starting dextrorotatory $\Delta^{8(9)}$-3-methyl-7-oxo-8-(3'-oxobutyl)3,4-[3'-benzoyloxy-cyclopentano-(2',1')]-octahydronaphthalene of Formula I (Ac=C$_6$H$_5$CO), various known processes may be used. Purely for purposes of illustration, the following describes the successive stages of a total synthesis of dextrorotatory compound I.

(a) Preparation of the levorotatory enantiomorph of 1β-hydroxy-3-carboxy-6-methoxy-9aβ-methyl-1,8,9,9a-tetrahydro-2H-benzo-[e]-indene, having a melting point of 223–225° C. and a specific rotation $[\alpha]_D^{20}=-120°$ (c.=1% in methanol) is made by resolution of the corresponding racemate. The resolution is made by forming a salt of the racemate with L (+)-threo-1-(p-nitrophenyl)-2-amino-propanediol-1,3 in the presence of methanol and precipitating the salt of the levorotatory enantiomorph with isopropyl ether, as it is described in copending, commonly assigned United States Patent 3,043,865.

(b) Preparation of 1β-hydroxy-6-methoxy-9aβ-methyl-1,8,9,9a-tetrahydro-2H-benzo-[e]-indene, having a melting point of 179° C. and a specific rotation $[\alpha]_D^{20}=-97°$ (c.=1% in methanol) is made by decarboxylation according to Banerjee et al., J. Am. Chem. Soc. 78, 3769 (1956).

(c) Preparation of 1β-hydroxy-6-methoxy-9aβ-methyl-3a,8,9,9a-tetrahydro-benzo-[e]-indane, having a melting point of 69° C. and a specific rotation $[\alpha]_D^{20}=+18°$ (c.=1% in methanol) is made by catalytic hydrogenation according to Banerjee et al., J. Am. Chem. Soc. 78, 3769 (1956).

(d) Preparation of $\Delta^{6(7),9(10)}$-3-methyl-7-methoxy-3,4-[3'-hydroxy-cyclopentano-(2',1')]-hexahydronaphthalene, not isolated, is made by a Birch reduction according to Chinn et al., 134th Meeting of Am. Chem. Soc., September 1958, page 14-0.

(e) Preparation of $\Delta^{6(7),9(10)}$-3-methyl-7-methoxy-3,4-[3'-benzoyloxy-cyclopentano-(2',1')]-hexahydronaphthalene, a non-crystallized oil, U.V. spectrum in ethanol: λ max.=229 mµ, ε=16,200; λ max.=280mµ, ε=1,083; λ max.=273 mµ, ε=1,192, is made by esterification with benzoyl chloride according to the procedure described in the copending, commonly assigned United States patent application Serial No. 6,111, filed February 2, 1960.

(f) Preparation of $\Delta^{9(10)}$-3-methyl-7-oxo-3,4-[3'-benzoyloxy-cyclopentano-(2',1')]-octahydronaphthalene, specific rotation $[\alpha]_D^{20}=+26°$ (c.=1% in methanol) is made by hydrolysis; with oxalic acid according to the process described in the above-mentioned United States patent application Serial No. 6,111.

(g) Preparation of $\Delta^{9(10)}$-3-methyl-7-oxo-8-(3'-chloro-2'-butenyl)-3,4-[3'-benzoyloxy-cyclopentano-(2',1')]-octahydronaphthalene, a non-crystallized oil, U.V. spectrum λ max.=230 mµ, $E_{1 cm.}^{1\%}$=380; inflexion=272 mµ, $E_{1 cm.}^{1\%}$=35; λ max.=280.5 mµ, $E_{1 cm.}^{1\%}$=27.5; λ max.=302 mµ, $E_{1 cm.}^{1\%}$=10.7 is made by condensation with 1,3-dichloro-2-butene according to the process of the aforementioned United States Patent 3,019,252.

(h) Preparation of optically active $\Delta^{8(9)}$-3-methyl-7- oxo-8-(3'-oxobutyl)-3,4-[3'-benzoyloxy-cyclopentano-(2', 1')]-octahydronaphthalene of Formula I (Ac=C$_6$H$_5$CO) having a melting point of 117° C. and a specific rotation [α]$_D^{20}$=+43° (c.=1% in methanol) is made by acid hydrolysis according to the United States patent cited in (g) above.

The following examples, which are given purely for illustration, are non-limitative in character and will make the invention better understood to one skilled in the art.

The melting points are instantaneous melting points determined on a Maquenne block. The temperatures are given in degrees centigrade.

*Example I*

PREPARATION OF 19-NOR-TESTOSTERONE, STARTING WITH DEXTROROTATORY Δ$^{8(9)}$-3-METHYL-7-OXO-8-(3'-OXO - BUTYL)- 3,4-[3'- BENZOYLOXY - CYCLOPENTANO-(2',1')]-OCTAHYDRONAPHTHALENE OF FORMULA I. (Ac=C$_6$H$_5$CO)

(1) *Hydrogenation.*—0.220 gm. of dextrorotatory Δ$^{8(9)}$-3-methyl-7-oxo-8-(3'-oxobutyl)-3,4-[3'-benzoyloxy-cyclopentano-(2',1')] - octahydronaphthalene, melting point 117° C., specific rotation [α]$_D^{20}$=+43° (c.=1% in methanol) were dissolved in 5 cc. of ethanol, and this solution was introduced into a neutral suspension of 0.025 gm. of palladized carbon containing 10% palladium in 10 cc. of ethanol, which suspension had previously been agitated for 15 minutes while passing hydrogen therethrough. The mixture was agitated at room temperature while passing hydrogen through it until the theoretical quantity of hydrogen had been absorbed. This took 3½ hours. The catalyst was then separated by vacuum filtration and washed with ethanol, and the combined ethanolic solutions were evaporated to dryness in vacuo. The residual resinous substance, consisting of 3-methyl-7- oxo-8-(3'-oxobutyl)-3,4-[3'-benzoyloxy-cyclopentano-(2',1')]-decahydronaphthalene of Formula II (Ac=C$_6$H$_5$CO) weighed 0.230 gm. It was purified by chromatography over 100 gm. of silica gel, and eluted with methylene chloride containing 1.7% acetone to give a yield of 95% on purification. The product thus obtained, the structure of which was confirmed by the U.V. spectrum in ethanol, λ max.=230 mµ, ε=14,500 and other maxima at 273 and 280 mµ, and by the infrared spectrum in carbon disulfide, 1,720 cm.$^{-1}$, is a colorless resin which is soluble in ether, acetone, benzene and chloroform, insoluble in water and dilute aqueous acids and alkalies.

This product is not described in the literature.

By hydrogenation of the racemic compound of Formula I (Ac=C$_6$H$_5$CO), melting point 98° C., by the mode of operation indicated above, compound II (Ac=C$_6$H$_5$CO) was obtained with a yield of 87%.

(2) *Cyclization.*—0.210 gm. of 3-methyl-7-oxo-8-(3'-oxobutyl) - 3,4 - [3'-benzoyloxycyclopentano-(2',1')]-decahydronaphthalene prepared above were dissolved in 3 cc. of methanol, and then 5.5 cc. of methanolic potassium hydroxide, containing 8 cc. of 50% aqueous potassium hydroxide per 100 cc. of solution were added to the above solution in an atmosphere of nitrogen. The mixture was refluxed for two hours in an atmosphere of nitrogen. A yellow solution was obtained which was concentrated to about 0.5 cc. 10 cc. of water were added to the concentrate and the aqueous mixture was extracted with ether. The extract solutions were washed with water until the wash water was neutral, dried over sodium sulfate and evaporated to dryness in vacuo at a low temperature. 0.125 gm. of a yellow resin was obtained, which consists of raw 19-nor-testosterone. By chromatography over 100 gm. of silica gel and elution with methylene chloride containing 6% acetone, followed by recrystallization from ether, pure 19-nor-testosterone, having a melting point of 121° C. and a specific rotation [α]$_D^{20}$=+50°±5° (c.=0.6% in ethanol) was obtained. It is identical to the product of the natural series in all respects.

The cyclization of racemic compound II, Ac=C$_6$H$_5$CO, by the mode of operation described above yields racemic 19-nor-testosterone having a melting point of 121–122° C. and an ultraviolet spectrum λ max.=241 mµ, ε=16,100.

*Example II*

PREPARATION OF 3-METHYL-7-OXO-8-(3'-OXOBUTYL)-3,4-[3'- BENZOYLOXY - CYCLOPENTANO -(2',1')]-DECAHYDRONAPHTHALENE (II, Ac=C$_6$H$_5$CO) BY CATALYTIC HYDROGENATION IN A STRONGLY BASIC MEDIA 550 mg. of Δ$^{8(9)}$-3-methyl-7-oxo-8-(3'-oxobutyl)-3,4-[3'-benzoyloxy - cyclopentano - (2',1')] - octahydronaphthalene (compound I, Ac=C$_6$H$_5$CO), having a melting point of 117° C. and a specific rotation [α]$_D^{20}$=+43° (c.=1% in methanol), were dissolved in 40 cc. of 95% ethanol. The solution was added to a suspension of 40 mg. of palladized carbon black containing 15% palladium hydroxide in 5 cc. of alcohol. Next an alcoholic solution of 10% triethylamine was introduced until the pH reached 11. Then the reaction was agitated under hydrogen for a period of one and a half hours. The mixture was then filtered, the filtrate evaporated to dryness under vacuum and the residue crystallized from isopropyl ether. A yield of 431 mg. (being 78%) of 3-methyl-7-oxo-8-(3'-oxobutyl) - 3,4-[3'-benzoyloxy-cyclopentano - (2',1')] - decahydronaphthalene was obtained having an instantaneous melting point of 114° C., and a specific rotation [α]$_D^{20}$=+48° (c.=1% in methanol). Starting from the mother liquor, another 17% of the identical product can be recovered. This product occurs in the form of colorless needles, soluble in methanol and ethanol, insoluble in water and dilute aqueous acids and alkalies.

*Analysis.*—C$_{25}$H$_{32}$O$_4$; molecular weight=396.5. Calculated: C, 75.72%; H, 8.13%. Found: C, 75.7%; H, 8.2%.

Ultraviolet spectra (in ethanol):
  λ max. at 230 mµ, ε=14,300
  λ max. at 273 mµ, ε=940
  λ max at 280 mµ, ε=765

Rotatory dispersion:
  /M/$_{400}$=+190
  /M/$_{350}$=−245
  /M/$_{317}$=−3,480 (minimum)
  /M/$_{309}$=−2,650 (inflexion)
  /M/$_{300}$=+290
  /M/$_{287}$=4,880 (peak)

This product can be cyclized by the process of Example I to give 19-nor-testosterone.

*Example III*

PREPARATION OF 19-NOR-TESTOSTERONE BY CYCLIZATION OF OPTICALLY ACTIVE 3-METHYL - 7 - OXO-8-(3'-OXOBUTYL)-3,4-[3'-BENZOYLOXYCYCLOPENTANO -(2',1')]- DECAHYDRONAPHTHALENE IN AN ACID MEDIUM 0.175 gm. of optically active 3-methyl-7-oxo-8-(3'-oxobutyl)-3,4-[3' - benzoyloxy-cyclopentano - (2',1')] - decahydronaphthalene, obtained according to Example I or II, was introduced into 3.5 cc. of acetic acid, and 0.22 cc. of concentrated pure hydrochloric acid were added thereto. The reaction solution was allowed to stand in an atmosphere of nitrogen at room temperature for 16 hours. Thereafter, 15 cc. of a 5% solution of sodium carbonate were added and the mixture was extracted several times with methylene chloride. The extracts were combined and washed with water, dried over sodium sulfate and evaporated to dryness in vacuo. 0.168 gm. of raw benzoate of 19-nor-testosterone was obtained, which represents a quantitative yield. The product, purified by recrystallization from isopropyl ether and then from ethyl acetate, has a melting point of 176° C., a specific rotation [α]$_D^{20}$=+106° (c.=1% in ethanol) and is identical to the product of the natural series in all respects.

It will be understood that the invention is not limited to the specific modes of execution described above.

Particularly, it is evident to one skilled in the art that it is possible to use equivalent techniques such as varying the temperatures, the nature of the solvents or the ester of the organic hydrocarbon carboxylic acid having from 1 to 18 carbon atoms, without departing from the spirit of the invention or the scope of the appended claims.

We claim:
1. 3-methyl-7-oxo-8 - (3'-oxobutyl) - 3,4 - [3'-acyloxy-cyclopentano-(2',1')] - decahydronaphthalene compounds of the formula:

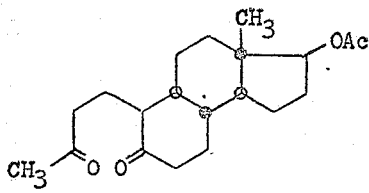

wherein Ac represents the acyl radical of an organic hydrocarbon carboxylic acid having from 1 to 18 carbon atoms selected from the group consisting of alkanoic acids, alkenoic acids, cycloalkyl-alkanoic acids, arylalkanoic acids, cycloalkyl carboxylic acids and phenyl carboxylic acids.

2. 3-methyl-7-oxo-8-(3'-oxobutyl)-3,4-[3' - benzoyloxy-cyclopentano-(2',1')]-decahydronaphthalene.

3. A process for the preparation of a 19-nor-testosterone compound selected from the group consisting of optically active 19-nor-testosterone, racemic 19-nor-testosterone, and their esters with organic hydrocarbon carboxylic acids having from 1 to 18 carbon atoms selected from the group consisting of alkanoic acids, alkenoic acids, cycloalkyl-alkanoic acids, arylalkanoic acids, cycloalkyl carboxylic acids and phenyl carboxylic acids, which comprise the steps of hydrogenating a $\Delta^{8(9)}$-3-methyl-7-oxo-8-(3'-oxobutyl)-3,4-[3'-acyloxy-cyclopentano-(2',1')] - octahydronaphthalene compound of the formula:

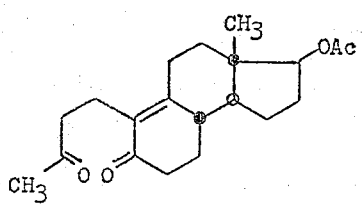

wherein Ac represents the acyl radical of an organic hydrocarbon carboxylic acid having from 1 to 18 carbon atoms selected from the group consisting of alkanoic acids, alkenoic acids, cycloalkyl-alkanoic acids, arylalkanoic acids, cycloalkyl carboxylic acids and phenyl carboxylic acids, with hydrogen in the presence of a palladized catalyst in a neutral to basic reaction media, reacting the resulting 3-methyl - 7 - oxo - 8 - (3'-oxobutyl)-3,4-[3'-acyloxy-cyclopentano-(2',1')] - decahydronaphthalene compounds of the formula:

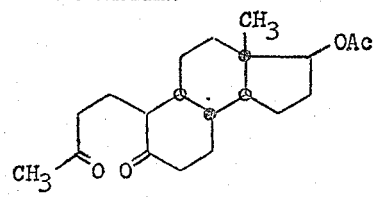

wherein Ac has the previously assigned meaning with a dehydrating agent selected from the group consisting of alkali metal lower alkanolates and hydrochloric acid, and recovering said 19-nor-testosterone compound.

4. The process of claim 3 wherein Ac represents the benzoyl radical.

5. The process of claim 3 wherein said hydrogenating step is effected at a pH of about 11 in the presence of an inert organic solvent.

6. The process of claim 3 wherein said dehydrating agent is an alkali metal lower alkanolate and the reaction is effected in an inert organic solvent at reflux temperature.

7. The process of claim 3 wherein said dehydrating agent is concentrated hydrochloric acid and the reaction is effected at room temperature in an acetic acid medium.

8. The process of producing dextrorotatory 19-nor-testosterone which comprises the steps of hydrogenating dextrorotatory $\Delta^{8(9)}$-3-methyl-7-oxo-8-(3'-oxobutyl)-3,4- [3' - benzoyloxy - cyclopentano - (2',1')] - octahydronaphthalene with hydrogen in the presence of a palladized catalyst in a neutral to basic reaction media in an inert organic solvent, refluxing the optically active 3-methyl-7-oxo-8-(3'-oxobutyl)-3,4 - [3'-benzoyloxy - cyclopentano-(2',1')]-decahydronaphthalene with an alkali metal methylate in methanol and recovering dextrorotatory 19-nor-testosterone.

9. The process of producing dextrorotatory 19-nor-testosterone benzoate which comprises the steps of hydrogenating dextrorotatory $\Delta^{8(9)}$-3-methyl-7-oxo-8-(3'-oxobutyl)-3,4-[3'-benzoyloxy - cyclopentano - (2',1')] - octahydronaphthalene with hydrogen in the presence of a palladized catalyst in a neutral to basic reaction media in an inert organic solvent, contacting the optically active 3-methyl-7-oxo-8-(3'-oxobutyl) - 3,4 - [3'-benzoyloxy-cyclopentano-(2',1')] - decahydronaphthalene with concentrated hydrochloric acid in anhydrous acetic acid at room temperature and recovering dextrorotatory 19-nor-testosterone benzoate.

10. The process of producing 3-methyl-7-oxo-8-(3'-oxobutyl)-3,4 - [3'-acyloxy - cyclopentano - (2',1')] - decahydronaphthalene compounds of the formula:

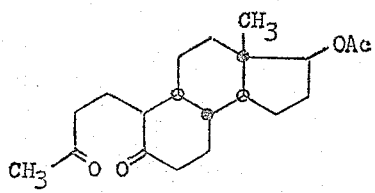

wherein Ac represents the acyl radical of an organic hydrocarbon carboxylic acid having from 1 to 18 carbon atoms selected from the group consisting of alkanoic acids, alkenoic acids, cycloalkyl-alkanoic acids, arylalkanoic acids, cycloalkyl carboxylic acids and phenyl carboxylic acids, which comprises hydrogenating a $\Delta^{8(9)}$-3-methyl-7-oxo - 8 - (3'-oxobutyl) - 3,4-[3'-acyloxy - cyclopentano-(2'-1')]-octahydronaphthalene compound of the formula:

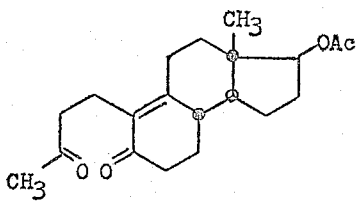

wherein Ac has the previously assigned meaning with hydrogen in the presence of a palladized catalyst in a neutral to basic reaction media and an inert organic solvent and recovering said decahydronaphthalene.

11. The process of claim 10 wherein the hydrogenating step is conducted in a neutral reaction media.

12. The process of claim 11 wherein the hydrogenating step is conducted in a basic reaction media.

13. The process of claim 12 wherein said basic reaction media is obtained by the addition of sufficient triethylamine to bring the pH to about 11.

References Cited in the file of this patent

Velluz et al., "Compt. Rend. Akad. Sci.," vol. 252, No. 25, June 19, 1961, pages 3903–3905 relied on.